United States Patent

[11] 3,596,202

[72] Inventor Chandra K. N. Patel
 Chatham, N.J.
[21] Appl. No. 814,510
[22] Filed Mar. 28, 1969
[45] Patented July 27, 1971
[73] Assignee Bell Telephone Laboratories, Incorporated
 Murray Hill, Berkeley Heights, N.J.
 Continuation-in-part of application Ser. No. 409,682, Nov. 9, 1964, now abandoned,
 Continuation-in-part of application Ser. No. 474,546, July 26, 1965, now abandoned,
 Continuation-in-part of application Ser. No. 495,844, Oct. 14, 1965, now abandoned.

[54] CARBON DIOXIDE LASER OPERATING UPON A VIBRATIONAL-ROTATIONAL TRANSITION
 3 Claims, 8 Drawing Figs.
[52] U.S. Cl. ................................................. 331/94.5
[51] Int. Cl. ................................................. H01p 3/22

[50] Field of Search ................................. 331/94.5

[56] References Cited
 UNITED STATES PATENTS
 3,353,115 11/1967 Maiman .................... 331/94.5
 OTHER REFERENCES
 Legay et al: Comptes Rendus, Vol. 259, pp. 99— 102, July 6, 1964.
 Patel et al: Bull. Amer. Phys. Soc. Vol. 9, pg. 500, April 15, 1964.

Primary Examiner—Ronald L. Wibert
Assistant Examiner—Edward S. Bauer
Attorneys—R. J. Guenther and Arthur J. Torsiglieri ABSTRACT: There is disclosed a laser providing emission of coherent radiation near 10 microns in the far infrared and utilizing transitions between vibrational-rotational levels in carbon dioxide. Also disclosed are beneficial effects from addition of oxygen, water vapor and helium to various forms of such a laser.

INVENTOR
C.K.N. PATEL
BY
Arthur J. Torsiglieri
ATTORNEY

CARBON DIOXIDE LASER OPERATING UPON A VIBRATIONAL-ROTATIONAL TRANSITION

RELATED APPLICATIONS

This application is a continuation-in-part of applications Ser. No. 409,682, filed Nov. 9, 1964; Ser. No. 474,546, filed July 26, 1965; and Ser. No. 495,844, filed Oct. 14, 1965, all three of which applications are now abandoned. C

BACKGROUND OF THE INVENTION

This invention relates to gas lasers. A gas laser is a device which includes a gaseous active medium capable of the stimulated emission of coherent radiation and means for pumping the medium to populate selectively an energy level which is optically connected to a lower energy level, whereby there is established a population inversion with respect to such two levels. In a laser oscillator, the overall gain must exceed the losses, including the fractional power output. To achieve oscillations, it is important to enclose the active medium in an optical resonator, from which a portion of the coherent radiation can be extracted. In a laser amplifier an optical resonator is not necessary; but it is important to make provision for introducing a beam to be amplified and for extracting the amplified beam.

The incorporation of the foregoing components into an optical device was proposed by A. L. Schawlow et al. in their U.S. Pat., No. 2,929,922, issued Mar. 22, 1960.

The stimulated radiation has several properties which are usually referred to by calling it coherent radiation. The first is a very narrow frequency spectrum, as well as a desired phase relationship. This aspect of coherency is sometimes termed temporal coherency. The second typical property of the coherent light is its capability for being confined in a narrow beam, which property is sometimes termed spatial coherency. One attractive aspect of gas lasers is the high degree of spatial and temporal coherency that can be obtained.

An attractive aspect of gas lasers consists of the variety of different processes which may be used in the formation and destruction of excited states, in order to obtain population inversion between a pair of optically connected states. As pointed out in the article by W. R. Bennett, Jr., "Gaseous Optical Masers," *Applied Optics, Supplement on Optical Masers*, Vol. 1, page 24 at 34 (1962), optical maser oscillation has been produced in gas systems where population inversion was accomplished by optical pumping, electron impact, excitation transfer in nonelastic atom-atom collisions, and by molecular dissociation in atom-molecule collisions. In addition, in my prior application filed Mar. 15, 1963, now Pat. No. 3,411,105, pumping of gaseous atoms by electron impact is disclosed in discharges in which molecules have been dissociated.

An important deficiency of gas lasers hitherto has been their very low efficiency, typically small fractions of one percent (1 percent). One interesting approach to this problem is that suggested by J. C. Polanyi, "Proposal for an Infrared Laser Dependent upon Vibrational Excitation," *Journal of Chemical Physics*, Vol. 34, page 347 (1961). Polanyi points out that the radiative lifetimes for vibrationally excited states are several orders of magnitude greater than for electronic states, thus facilitating attainment of relatively high concentrations of selectively excited vibrational species. In addition, vibrational excitations can typically be very efficiently produced. Nevertheless, the specific gases, sodium iodide and hydrogen chloride, suggested by Polanyi are not suitable choices for providing outputs of coherent radiation.

An object of the present invention is a gas laser of improved efficiency and power output.

SUMMARY OF THE INVENTION

I have discovered that the emission of coherent radiation near 10 microns in the far infrared may be efficiently obtained from transitions between vibrational-rotational levels in carbon dioxide. I have also discovered beneficial effects upon efficiency and power output from addition of oxygen, water vapor and helium.

One specifically described species of the invention involves a two-gas system, one of which serves as the exciting gas to help establish a population inversion, and the other as the lasing gas from which the desired radiation is stimulated; and there is avoided undesired excitation of the lasing gas by avoiding any treatment of the lasing gas which gives rise to such undesired excitation. Specifically, the lasing gas is not itself subjected to its discharge, in contradistinction with the usual practice in prior art forms of gas lasers.

Nevertheless, as disclosed in my earlier article "Interpretation of CO Optical Maser Experiments," *Physical Review Letters*, Vol. 12, page 588 (May 25, 1964), an earlier embodiment of my invention, for establishing the population inversion, employed the electron impact excitation of carbon dioxide directly. Such embodiments are attractive for many applications because of their simplicity.

Carbon dioxide lasers according to my invention may also be pumped by chemical reactions generating carbon dioxide and vibrationally excited nitrogen.

In this first-mentioned embodiment of the invention in which nitrogen serves as the exciting gas and carbon dioxide as the lasing gas, the nitrogen is excited in a separate chamber and thereafter made to flow therefrom into an interaction chamber for mixing there with the carbon dioxide, which is introduced in an unexcited state. A continuous flow of both gases is employed for a continuous operation. The carbon dioxide becomes excited in the interaction chamber by collision with the excited nitrogen in a highly selective fashion. The interaction chamber is positioned within an optical resonator $_2$which provides the regeneration, to facilitate achieving stimulated emission from the excited carbon dioxide.

The excited nitrogen, which is the exciting medium, includes an excited level which has a relatively long lifetime, typically longer than 0.1 second, and which is not readily destroyed by wall collisions. In addition, as pointed out in the article by Morgan and Schiff, "The Study of Vibrationally Excited $N_2$ with the Aid of an Isothermal Calorimeter," *Canadian Journal of Chemistry*, Vol. 41, page 903 at 909 and 910 (1963), this nitrogen level is closely matched in energy to a carbon dioxide vibrational level, which I had found is the upper laser level of the 10.6 micron transition employed in my laser.

With respect to the beneficial effects of other gases, I have discovered that the addition of oxygen to the gaseous medium of a carbon dioxide vibrational-rotational transition laser makes feasible the use of higher total gas pressure in the lasing gas, which in turn results in increased efficiency and increased power output. Further, I have discovered that the addition of water vapor to the laser also increases the efficiency and power output. By such additions, continuous-wave stimulated radiation was obtained at 10.6 microns at a power level of about 16 watts with an efficiency of more than four percent (4 percent).

I have discovered still further that a substantial increase in power output and efficiency of a molecular nitrogen-carbon dioxide laser operating at a wavelength near 10.6 microns can be obtained by adding helium. Overall efficiencies of about 20 percent and continuous-wave power outputs of about 75 watts per meter, even for relatively long lasers, are achievable in this way. The overall efficiency and overall power outputs obtainable are higher than for any other laser, at present. In specifically-described embodiments employing helium, the tube containing the gaseous mixture has a diameter in the lasing region of two inches or more.

I have also found that advantageous materials, transmissive at about 10 microns, for Brewster-angle end windows and mirror substrates in such lasers include crystalline zinc sulfide, barium fluoride or potassium chloride. Output coupling is advantageously provided through a transmissive central aperture in one reflector.

BRIEF DESCRIPTION OF THE DRAWING

The invention will be further described in the following more detailed description, taken in conjunction with the accompanying drawings, in which.

DESCRIPTION OF ILLUSTRATIVE EMBODIMENTS

Figure 1:
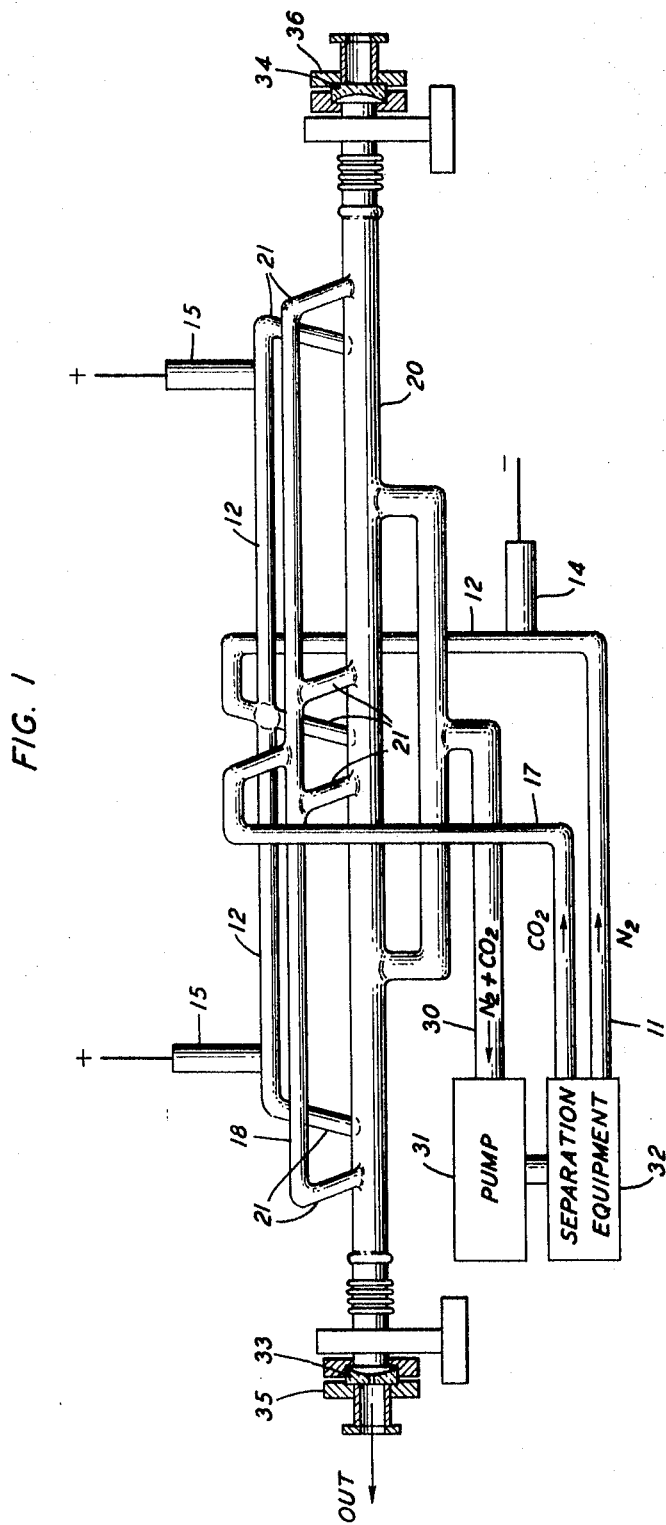
FIG. 1 shows schematically a partially cutaway view of an illustrative embodiment of the invention.

With reference now to the drawing, the laser shown in FIG. 1 includes a first section where the nitrogen which serves as the exciting gas is treated for the production of molecules in the vibrational level of the ground electronic state. In the embodiment depicted, this involves subjection of the nitrogen to a DC discharge where electron-ion recombinations, atom-atom recombinations and excitation indirectly by electron impact on nitrogen molecules as well as cascades provide the desired excitation of the nitrogen molecules. In particular, nitrogen, advantageously of a purity better than 99.99 percent, is introduced into the discharge region via an inlet port 11 for continuous flow, for example, at a linear flow rate of the order of 500 centimeters per second. The discharge is confined within the multisection glass tube 12. In the design being described specifically, this tube has an inner diameter of about 20 millimeters. The discharge region in this tube is defined by the cathode 14 and the pair of anodes 15. The use of two spaced anodes permits elongation of the discharge path without a corresponding increase in the DC voltage required. A DC voltage source (not shown) supplies the power necessary. For the design being described involving a separation of about 60 centimeters between the cathode and each anode, 2,000 volts with a current flow of 9 milliamperes proved satisfactory. Such voltages and currents provide a discharge that is substantially cooler than the discharge employed in my above-cited U.S. Pat., No. 3,411,105, and produces much less molecular dissociation in the discharge.

The now excited nitrogen is made to flow out of the discharge region into the interaction region, into which is also introduced unexcited carbon dioxide, also advantageously of high purity, by way of inlet port 17 and distribution tube 18. The interaction region is enclosed within a glass tube 20. In the design being described, this tube had an inner diameter of about 25 millimeters. To improve the mixing of the exciting nitrogen and the lasing carbon dioxide, the nitrogen and carbon dioxide are each introduced into the interaction region at a number of separate inlets 21, spaced apart along the interaction region as shown. To keep small the amount of atomic nitrogen introduced into the interaction region, and thereby to improve the efficiency of the interacting, the distance between the discharge region and the point at which nitrogen enters the interaction region advantageously is made in each instance at least 6 centimeters to provide time for substantial completion of all the atomic and electron-ion recombination in the nitrogen before mixing with the carbon dioxide. In the design discussed, the carbon dioxide and nitrogen flow rates were adjusted to be nearly equal with a total gas pressure of 0.8 Torr in the interaction region.

The spent gases are withdrawn from the interaction region by way of the exhaust port 30 under the action of a pump 31 which controls the flow. Advantageously, as shown, the mixture evacuated is supplied to apparatus shown schematically for separating the two components and after separation returning the separate components to the appropriate inlet ports of the system. The separation apparatus has not been shown in detail as the techniques for such separation are known. Typically, separation would involve passing the mixture through a cold trap for solidification of the carbon dioxide.

To achieve oscillation, it is important to enclose the interaction region in an optical resonator. In the specific design being discussed, the resonator was formed by a pair of near confocal concave mirrors 33, 34 spaced apart about 1.4 meters and supported by suitable mirror mounts 35, 36, respectively. The mirrors are illustratively pressed polycrystalline zinc sulfide coated to be opaque with vacuum-deposited gold, and energy was coupled out from the resonator through a 0.5 millimeter aperture in the center of mirror 33.

If the laser be intended for use as a straight through amplifier the resonator becomes unnecessary and the mirrors can be eliminated. In some instances, it may be preferred to locate the mirrors outside the interaction region, in which case Brewster-angle windows of material transmissive at 10.6 microns, for example, pressed polycrystalline zinc sulfide, barium fluoride or potassium chloride, can be used to confine the interaction region.

A discharge in low pressure nitrogen results in very efficient production of nitrogen molecules in the vibrational levels of their ground electronic state. Since nitrogen has a zero permanent dipole moment, such molecules cannot decay to the $v=0$ vibrational level through electric dipole radiation. Thus, the effective lifetimes of these states are governed primarily by deactivation through collisions with other molecules and walls, and accordingly can be high, for example, several seconds.

Figure 2:
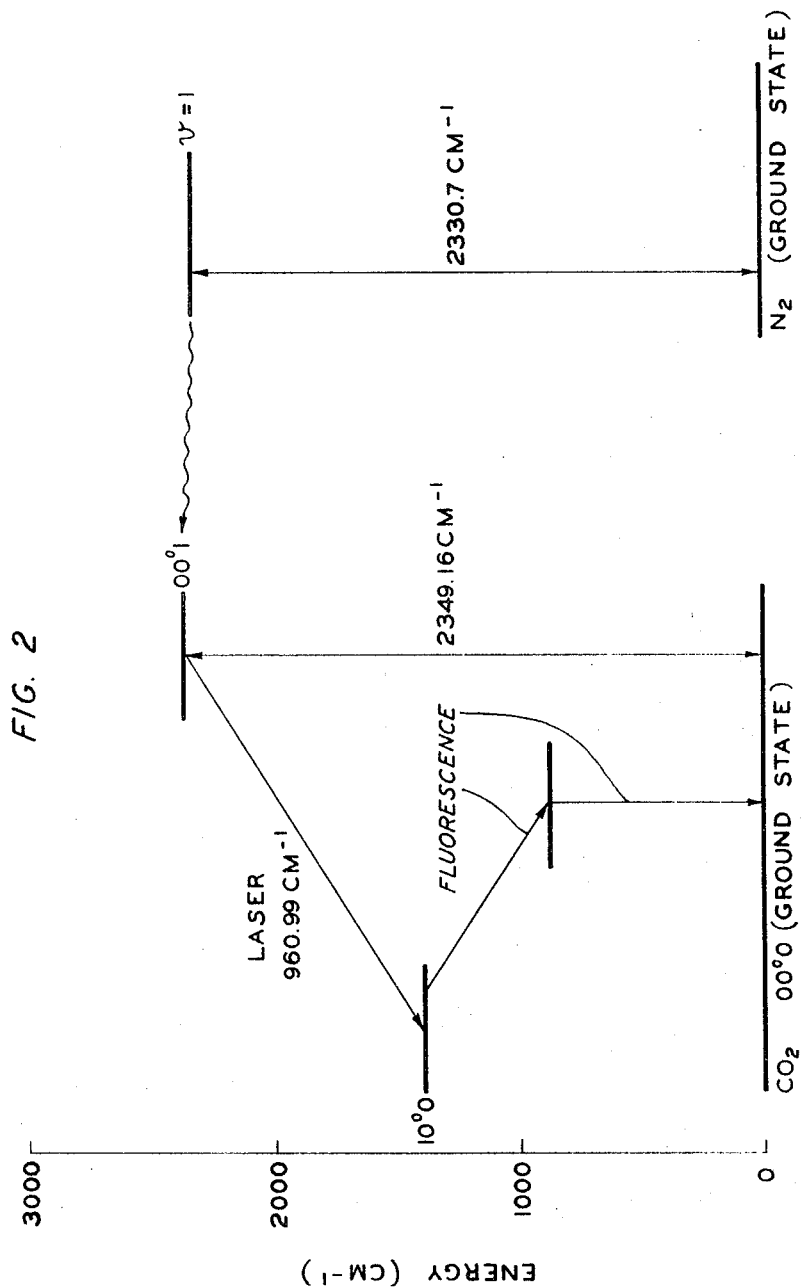
FIG. 2 is a partial energy-level diagram of the $N_2$–$CO_2$ system, which will be useful in describing the invention.

In FIG. 2, there is shown the vibrational level $v=1$ for nitrogen with respect to the ground state of nitrogen. The other vibrational levels have been omitted for simplicity as unimportant. There have also been shown the vibrational energy levels of carbon dioxide of interest, with respect to its ground state (00°0). It can be seen that $N_2$ ($v=1$) at 2330.7 cm.[11] is in very close coincidence with the (00°1) vibrational level of $CO_2$ at 2349.16 cm.[11]. Thus, a collision of the second kind can have a large cross section because of the near-perfect coincidence. The lower laser level (10°0) on the other hand is removed from $N_2$ ($v=1$) by more than 900 cm.[11] and hence the cross section for exciting the $CO_2$ ground state molecules to the lower laser level will be very much smaller. Moreover, the excitation of $CO_2$ (00°0) molecules to level (10°0) involves a reaction which includes transitions which are optically forbidden. Thus, when the excited nitrogen molecules are allowed to mix with the carbon dioxide molecules, a selective excitation of $CO_2$ ground state molecules to the (00°1) level takes place. Moreover, since the lifetimes of the (00°1) levels are longer than the lifetimes of the (10°0) levels, the required conditions for laser action on the (00°1)—(10°0) transitions are satisfied. The particles thereafter relax from the (10°0) level to the ground state in cascade fashion as depicted schematically. The decay processes which are most important are the ones which involve collisions with other gas particles.

Laser oscillations were obtained at a number of wavelengths involving P-branch rotational transitions from P(14) to P(26). The strongest transition, corresponding to P(20), occurs at 10.5915 microns, and continuous wave power in excess of 1 milliwatt was readily obtained with less than 20 watts input power. As disclosed in my above-cited article of May 25, 1964, laser oscillation was also obtained on vibrational-rotational transitions of the carbon dioxide at 9.6 microns.

There are a large number of reactions through which one can produce various diatomic molecules in vibrationally excited levels and hence the selective excitation through vibrational energy transfer is applicable for obtaining laser action on vibrational-rotational transitions of polyatomic molecules in other mixed systems. Molecules in vibrationally excited levels are of special importance for both the exciting and the lasing gases because of the longer lifetimes available with such molecules. Another requirement on the exciting gas is that its excited molecules not be easily destroyed by wall collisions, making it feasible for transport of these molecules from the discharge region to the interaction region without excessive destruction. In some instances, it may be advantageous to treat the walls to minimize their effect on the lifetimes of incident excited particles. Also, it is advantageous that the molecule exhibit no permanent dipole moment so as to avoid radiative transitions between vibrational levels. This ordinarily means that the molecule of the exciting gas should be composed of like atoms. Additionally, of course, there is required the close coincidence between the vibrational level of the exciting gas and an upper level of the lasing gas, which level is optically connected to a lower level.

The specified conditions are also met, for example, in an $N_2-N_2O$ system and an $O_2-CS_2$ system (the first gas being the exciting gas and the second the lasing gas). In particular, the apparatus described has been used to generate oscillations in the $N_2-N_2O$ system at 10.8422 microns and other wavelengths.

It is a further advantage of lasers of the kind described that due to the absence of any discharge in the interaction region, the usual inverse relation of optical gain with diameter of the interaction region is typically not applicable here. Thus, the diameter of the interaction chamber can be increased with little adverse effect on the optical gain. Rather, because an increase in diameter can be translated into an increase in number of excited molecules, the optical power output can be increased by increasing the diameter of the interaction chamber.

Figure 3:
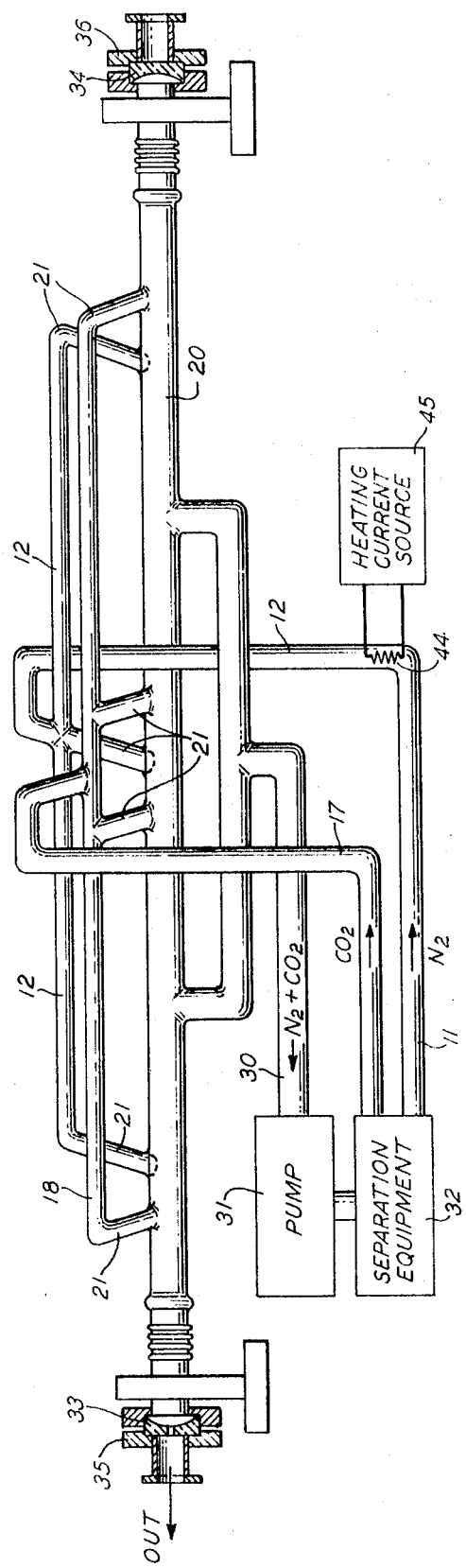
FIG. 3 shows schematically a modification of the embodiment of FIG. 1.

Various other techniques are feasible for the excitation of the exciting molecules. Such modifications include the use of a radio frequency discharge rather than a DC discharge and, most simply, heating the exciting gas to populate the desired $v=1$ level. For example, with nitrogen at 1440° K., the population corresponding to the Boltzmann distribution in the $v=1$ vibrational level is about 10 percent (10 percent) of the total nitrogen population, which is more than adequate for achieving lasing action with carbon dioxide. Such heating can be achieved simply by flowing the nitrogen past a heating element before introduction into the interaction region. In FIG. 3 such heating is illustratively provided by a heating element 44 of known type disposed within the region defined by tube 12. Heating element 44 may, for example, be energized from an electrical current source 45. Additionally, chemical reactions, for example, as described in the paper entitled "Vibrational Disequilibrium in Reactions Between Atoms and Molecules," *Canadian Journal of Chemistry*, Vol. 38, page 1769 et seq. (1960), can be employed to populate vibrational levels.

Figure 8:
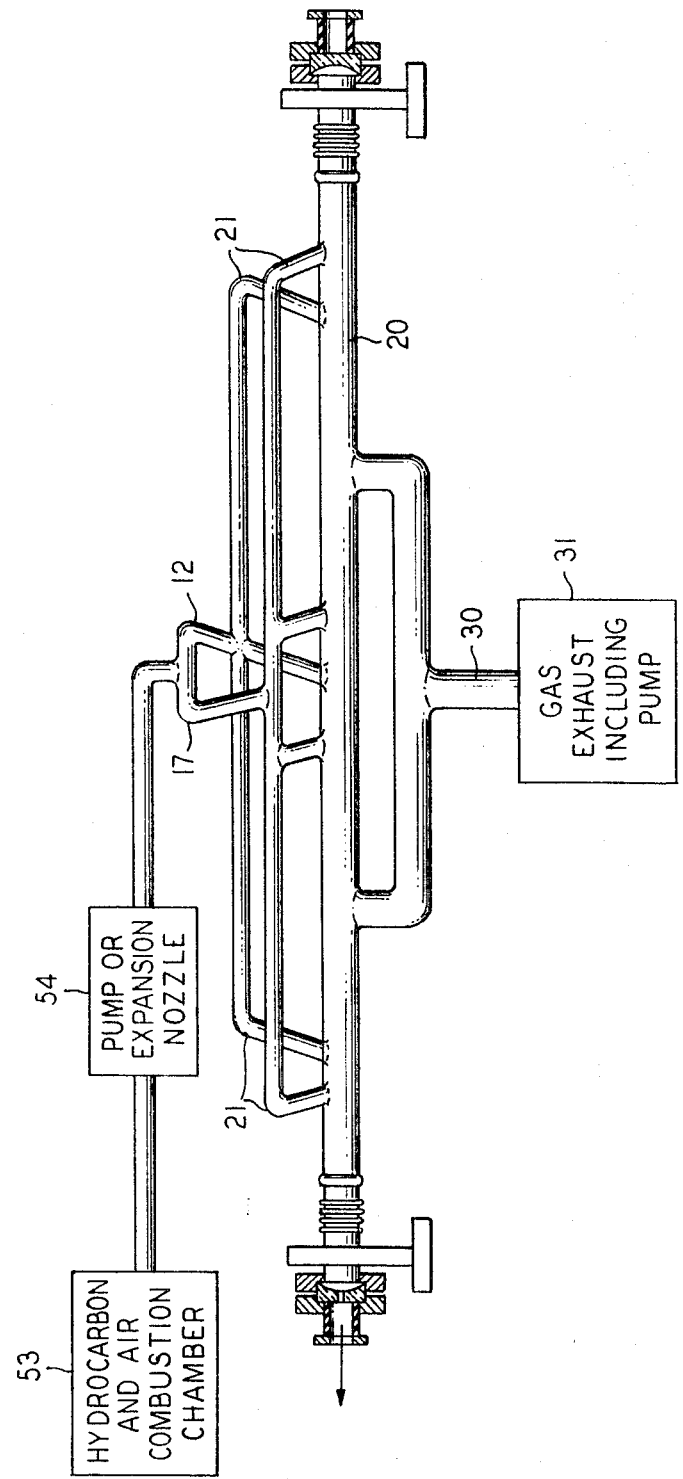
FIG. 8 shows another modification of the embodiment of FIG. 1.

A modification of the embodiment of FIG. 1 excited by a chemical reaction of the type disclosed in the just-cited article is shown in FIG. 8. A hydrocarbon is burned in air in combustion chamber 53, which for example could include a common Bunsen burner, and caused to flow through ducts 12 and 17 by a pump or, advantageously, an expansion nozzle 54. It is known that hydrocarbon-air flames reach a temperature of about 2500°—3000° C. The flame products include $CO_2$ and $N_2$ both of which are vibrationally excited because of the high temperature of the flame. Expansion nozzles are well-known means for causing heated gases to flow and reduce the molecular and rotational temperature of molecules at the same time but leave the vibrational temperature unaffected which is a desired condition for laser action on molecular vibrational-rotational transitions. The combustion produces adequate amounts of both carbon dioxide and vibrationally excited nitrogen. The spent gases are then exhausted to the atmosphere.

In embodiments of my invention employing electron impact excitation of carbon dioxide, the parameters of the discharge in carbon dioxide are similar to those disclosed above for the discharge in nitrogen. That is, the voltages per unit length and the currents are such that the degree of molecular dissociation produced is not great enough to interfere with the generation and coupling out of radiation from the vibrational-rotational transitions near 10 microns. More especially, it is important to maintain a desired concentration of undissociated molecules of carbon dioxide.

In order to improve the power output and efficiency of the $CO_2$ lasers described above, it is important to (a) increase the depopulation rate for the lower laser level (00°1 or 02°0) or (b) increase the rate at which $CO_2$ molecules are excited to the upper laser level (00°1). The additive gases (in addition to $N_2$ and $CO_2$) described in the patent applications Ser. No. 474,546 and Ser. No. 495,844 help to achieve this end.

Figure 4:
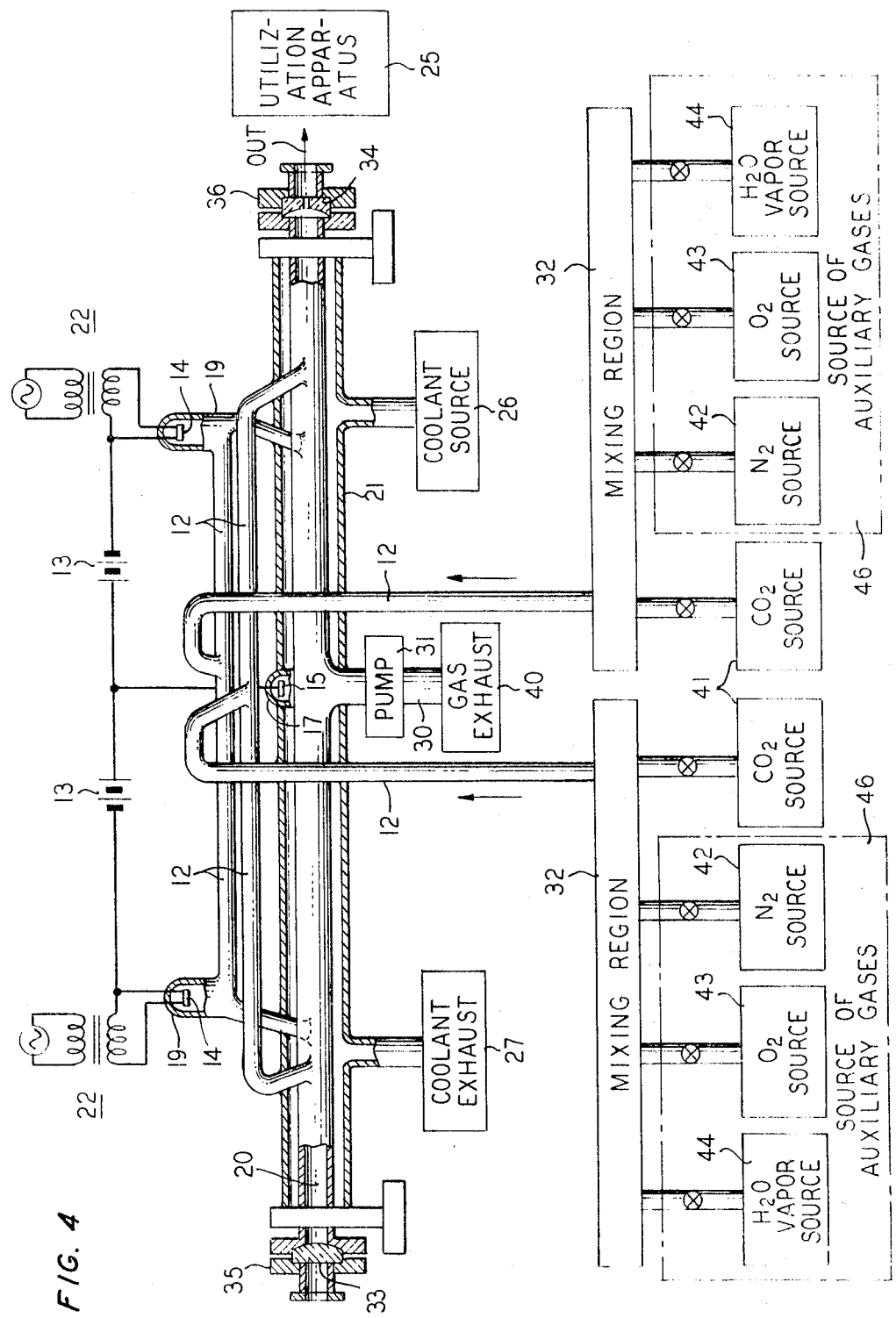
FIG. 4 shows schematically and block diagrammatically a partially cutaway view of another embodiment of the invention employing oxygen and water vapor.
Figure 5:
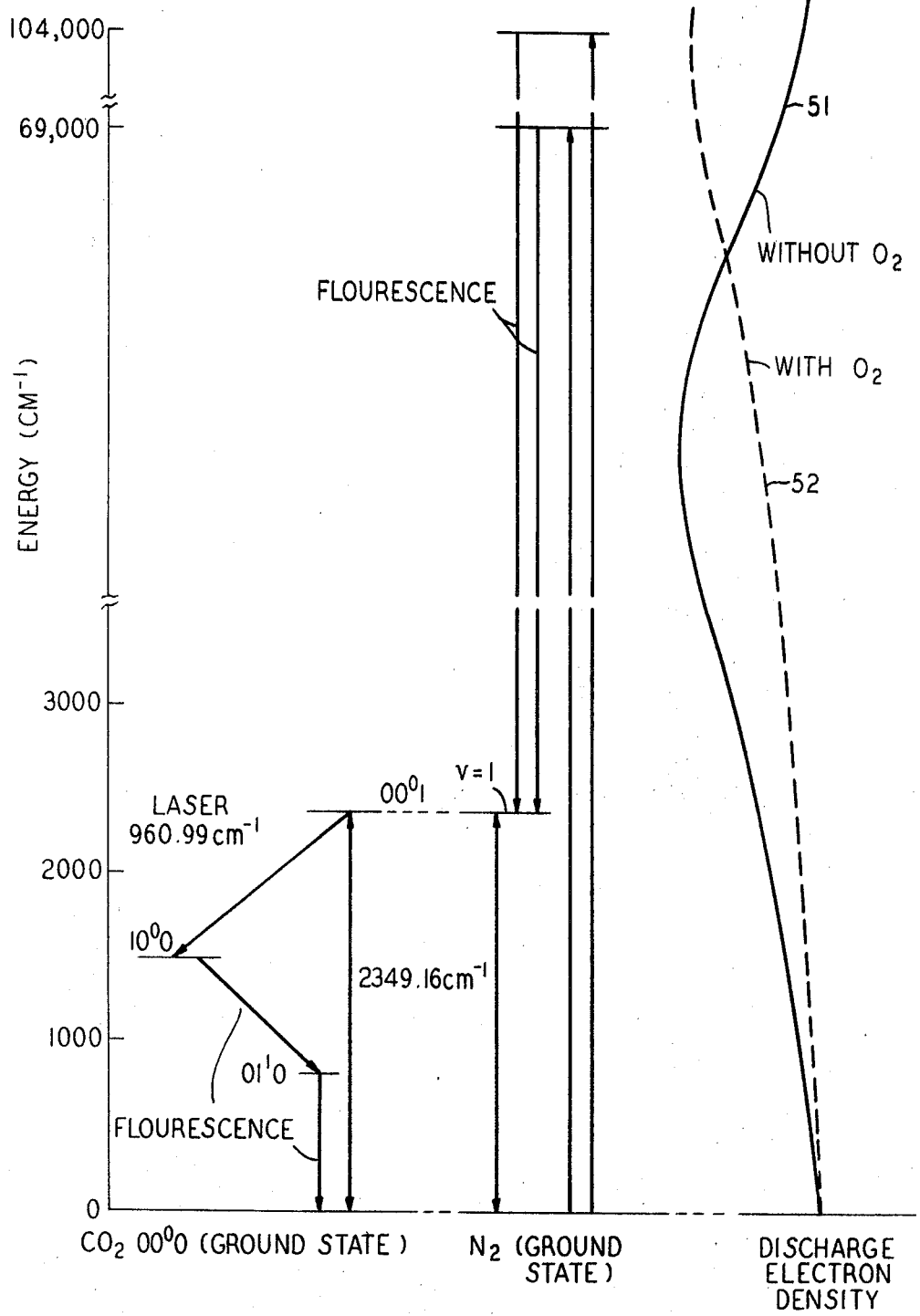
FIG. 5 shows an energy-level diagram pertinent to the embodiment of FIG. 4.

As described in the former one of the just-cited patent applications, I have discovered that oxygen and water vapor are additives which are effective to increase efficiency and power output in a molecular carbon dioxide laser, as illustrated in FIG. 4.

In FIG. 4, a laser operated according to the present invention included an interaction region comprising a tube 20 in which the lasing action was obtained, apparatus for furnishing therein a gas mixture containing additives as I have discovered, and apparatus for exciting the gas mixture to enable the stimulated emission of radiation therefrom.

Illustratively, the gas mixture was furnished by a continuous flow thereof from suitable sources 41—44 of carbon dioxide, nitrogen, oxygen and water vapor, respectively. In several of the experiments, portions of the nitrogen, oxygen and water vapor were provided by the inflow of moist room air. For these experiments, sources 42, 43 and 44 may be more conveniently described as a source 46 of auxiliary gases, even though a substantial supplementary flow of nitrogen gas was provided from a tank of gaseous nitrogen in some of these experiments.

In any event, the gases were flowed through mixing regions 32 and inlet apparatus 12 into the interaction region; and the spent gases were removed from the interaction region to the exhaust 40 by a pump 31.

The gas mixture was excited by electrical discharge apparatus disposed, for convenience, in one branch of the inlet apparatus 12. Specifically, the discharge apparatus included the oxide-coated cathodes 14 disposed in bulbous appendages 19 of apparatus 12 near opposite ends of tube 20, the anode 15 disposed in the bulbous appendage 17 of tube 20, the DC voltage sources 13 with positive terminals connected to anode 15 through current-limiting resistors 16 and negative terminals connected to cathodes 14, and the heater current sources 22 connected across cathodes 14. Because the anode 15 is disposed in the interaction region of tube 20, the discharge runs directly through the interaction region, in which the lasing action is obtained.

To increase the so-called population inversion between the upper and lower laser levels, i.e., the energy states associated with the stimulated radiation, it is desirable to increase the difference between the so-called rotational temperature, the molecular temperature and the vibrational temperature of the carbon dioxide. At the normal pressures of operation of carbon dioxide and other molecular lasers of this type, the rotational temperature and molecular temperature are very nearly equal. Thus we now want to obtain a high vibrational temperature but a low rotational temperature. To this end, the tube 20 was surrounded by a jacket 21 through which was flowed a coolant from source 26 to exhaust 27. Tap water at 15° C. was used in the experiments described in detail herein; but coolants capable of depressing the rotational temperature of the gas even further below room temperature were still more advantageous. The coolant determined the wall temperature of tube 20 and thus depressed the rotational temperature of the carbon dioxide. It appeared that the vibrational temperature was not substantially affected by the coolant.

To achieve oscillation, it is important to include the interaction region in an optical resonator. In the specific design being discussed, the resonator was formed by a pair of mirrors 33 and 34, the latter concave with 11 meters radius of curvature and the former convex with 10 meters radius of curvature in order to enlarge the mode volume to use the entire gas mixture within the interaction region for laser action. The mirrors were spaced at 240 centimeters. The mirrors were supported by suitable mirror mounts 35 and 36, respectively, and were coated to be opaque with vacuum-deposited gold. Energy was coupled out from the resonator through a 12.5 millimeter aperture in the center of concave mirror 34.

Figure 6:
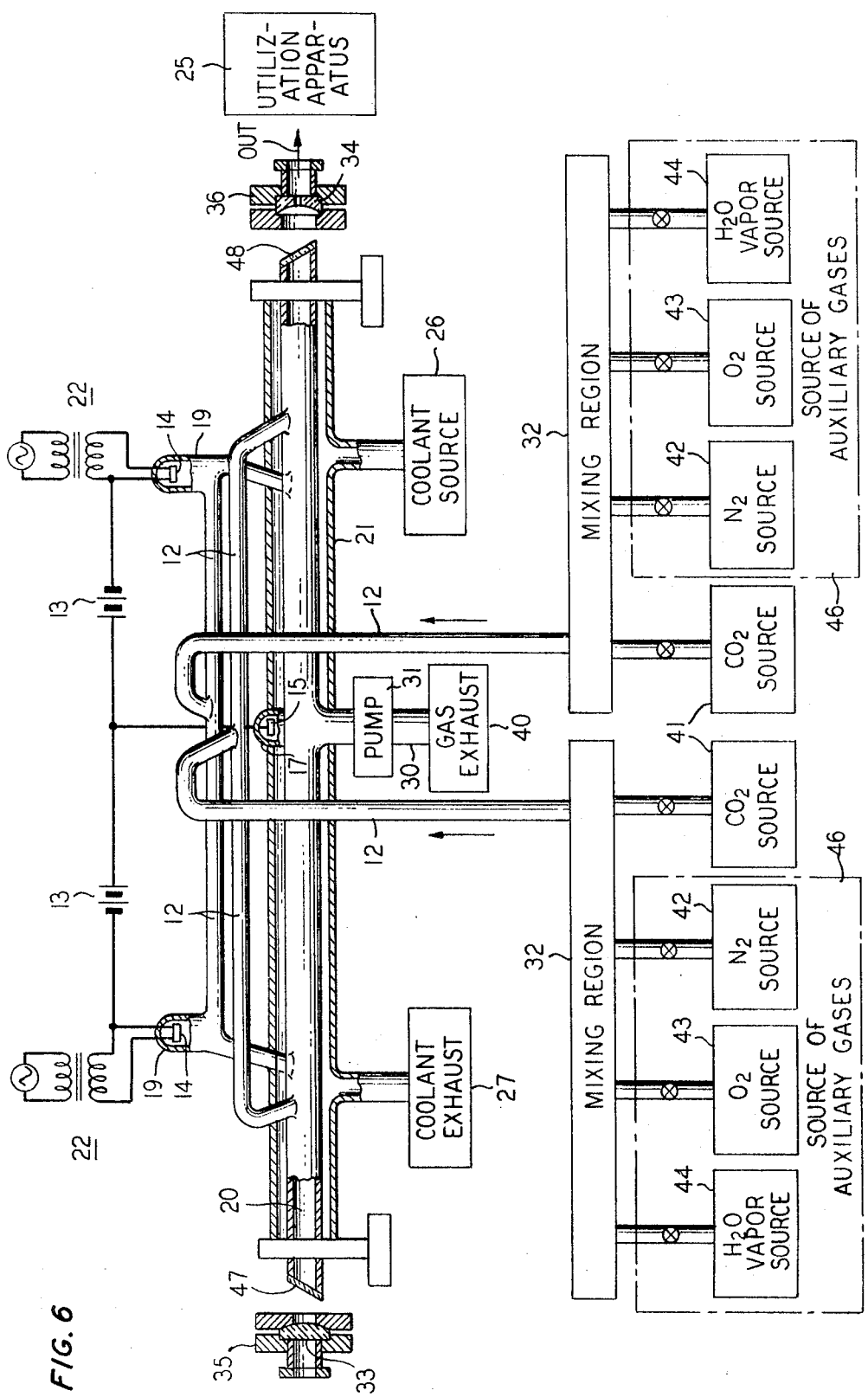
FIG. 6 shows a modification of the embodiment of FIG. 4.

If the laser be intended for use as a straight-through amplifier, the resonator becomes unnecessary; and the mirrors can be eliminated. In some instances, it may be preferred to locate the mirrors outside the interaction region, in which case Brewster-angle windows (for example, of crystalline zinc sulfide, barium difluoride or potassium chloride) can be used to confine the interaction region. Such a modification of the embodiment of FIG. 4 including windows 47 and 48 of such materials is shown in FIG. 6. It should be apparent that the substrates of the partially transmissive mirrors advantageously may be of such materials.

The tube 20 in which the multiple gases interacted in the embodiment of FIG. 4 was a glass tube, although it could be some other rigid tubular structure, such as a tube of nonconducting plastic or quartz. The glass tube 20 extended the distance between mirrors 33 and 34 and had an inside diameter of 25 millimeters. The effective interaction region was observed to extend between the points at which apparatus 12 enters tube 20 and was about 2 meters long.

Cathodes 14 were oxide-coated cathodes having 220 nickel bases and containing barium carbonate and strontium carbonate in the respective proportions 55 percent–45 percent. The nickel bases inherently included such activator impurities as $Si$, $Ti$, $Al$ and $Mg$ in very small amounts.

Laser oscillation was obtained at a number of wavelengths involving P-branch rotational transitions P(14) to P(26), primarily P(18), P(20) and P(22). The strongest transition, corresponding to P(20), occurred at 10.5915 microns.

For each gas mixture, the laser power output was measured by a calibrated thermopile disposed beyond the aperture of concave mirror 34. It should be understood that the output stimulated radiation has a variety of uses and that the calibrated thermopile could illustratively be replaced by a desired utilization apparatus 25, which could, for example, be an electro-optic modulator responsive to an information signal. The invention is particularly useful for communication, inasmuch as the atmosphere has relatively low attenuation at $10.6\mu$. The wavelength range near to $10.6\mu$ is commonly called an atmospheric window.

One specific example of the operation of my invention was obtained by mixing carbon dioxide having a pressure of 0.4 Torr with room air having a partial pressure of about 1.0 Torr made up essentially of about 0.7 Torr $N_2$, 0.3 Torr $O_2$ and 0.04 Torr $H_2O$ and with additional nitrogen gas having a partial pressure of about 1.0 Torr. Tap water was flowed through jacket 21 at 15° C. With each of sources 13 providing 50 milliamperes of current at 4,000 volts, i.e., about 400 watts of power, a continuous-wave power output of 16.2 watts from the laser was measured by the calibrated thermopile. Other experiments, which involved flowing alcohol through jacket 21 at temperatures and rates that provided rotational temperatures down to −40° C. in the gas mixture within tube 20, provided improved efficiency and power in direct relation to the amount by which the rotational temperature of the gas was depressed below the vibrational temperature of the gas mixture.

When the input air was dried with calcium chloride to remove the water vapor, the coolant being tap water at 15° C., a power output of 12 watts was obtained.

For purposes of comparison, measurements were made for a nearly optimum mixture of $CO_2$ and $N_2$ with no other additives. With the partial pressure of nitrogen approximately equal to 0.4 Torr and the partial pressure of carbon dioxide approximately equal to 0.4 Torr, the coolant being tap water at 15° C., a power output of 4.5 watts was obtained.

It should be particularly noted that the nitrogen partial pressure was much lower in the mixture without additives than in the previously described mixtures with additives and, if raised beyond about 1.0 Torr without additives, tended to reduce the power output. For the system without additives, the power output and efficiency were observed to be fairly constant for nitrogen pressures between 0.4 and 1.0 Torr. However, the additives oxygen and water vapor permitted the nitrogen partial pressure to be increased further with a corresponding increase in power output.

It appears that the oxygen partial pressure within the interaction region should be greater than 0.1 Torr for an appreciable effect in increasing the efficiency of the laser, but less than 0.5 Torr. For an appreciable additional effect from the water vapor, its partial pressure within the interaction region should be greater than 0.01 Torr; but less than 0.1 Torr. The carbon dioxide pressure should be greater than 0.1 Torr and less than 1.0 Torr; and the nitrogen pressure should be greater than 0.1 Torr and less than 10.0 Torr.

An alternative embodiment of my invention would employ an $N_2$–$N_2O$ gas mixture with $O_2$ and $H_2O$ additives, the excitation of nitrous oxide for lasing action being carried out in substantially the same way as the excitation of carbon dioxide for lasing action.

Further experiments relating to my invention are described in my articles in the *Applied Physics Letters*, July, 1965, and in the *Proceeding of the Physics of Quantum Electronics Conference*, San Juan, Puerto Rico, June, 1965.

I suggest, without wishing to limit my invention hereby, that a variety of theoretical considerations may be applicable, in varying degrees, to these observed results.

For the first such consideration, reference is made to FIG. 2, which shows the vibrational level $v=1$ and two other higher excited levels for nitrogen with respect to the ground state of nitrogen. There have also been shown the vibrational levels of carbon dioxide of interest, with respect to its ground state (00°0). It can be seen that the $N_2(v=1)$ level at 2330.7 cm.[11] is in very close coincidence with the (00°1) vibrational level of $CO_2$ at 2349.16 cm.[11]. Thus, a collision of the second kind can have a large cross section because of the near-perfect coincidence. The lower laser level (10°0) on the other hand is removed from $N_2(v=1)$ by more than 900 cm.[11] and hence the cross section for exciting the $CO_2$ ground state molecules to the lower laser level will be very much smaller. Moreover, the excitation of $CO_2$ (00°0) molecules to level (10°0) involves a reaction which includes transitions which are optically forbidden. Thus, when the excited nitrogen molecules transfer energy to the carbon dioxide molecules, a selective excitation of $CO_2$ ground state molecules to the (00°1) levels takes place. Moreover, since the lifetimes of the (00°1) levels are longer than the lifetimes of the (10°0) levels, the required conditions for laser action on the (00°1)—(10°0) transitions are satisfied. The shorter lifetime of the lower level is associated with the fact that the population of the lower level relaxes to the ground state through collisions in cascade fashion as depicted schematically.

An important point in the process just described is the efficient excitation of the nitrogen ($v=1$) vibrational level. It is known that it is relatively difficult to excite this level directly by electron impact. Accordingly, it is consistent with the observed results that the electron discharge in tube 20 excites, by impact, the higher excited levels in the nitrogen, as indicated. The population density of these short-lived excited levels then decays through spontaneous radiative transitions to populate the $v=1$ level, as indicated.

Vibrational excitation of $N_2$ by electron impact also occurs through a compound state of $N_2^1{}^2$ existing at about 2.3 ev. (frequency, about 18,400 cm.[11]) while the vibrational excitation of $CO_2$ by electron impact occurs through a compound state of $CO_2$ existing at about 1 ev. (frequency, about 8,000 cm.[11]). Thus, it is important to have as many electrons as possible which have their kinetic energies ranging from 1- 2.3 ev.

Lower efficiencies would tend to occur in such a laser without additives for the following reason. In a mixture of $CO_2$ and $N_2$ without additives the electron density in the discharge as a function of electron energy is as indicated by curve 51. The peak of this curve lies between the $v=1$ level and the higher excited levels, but substantially lower than about 2.3 ev.; and the energy expended by the applied electric field in accelerating these median-energy electrons is wasted, since they cannot excite any of the nitrogen levels and may pass out of the interaction region without being of use in the excitation of nitrogen or the upper laser level of the carbon dioxide.

A possible distribution of electron energies in the discharge with oxygen is shown by curve 52. Since the vertical axis of these curves represents energy and the horizontal axis represents relative numbers of electrons, it is seen that a substantial number of electrons would be shifted to higher energies.

Thus, it is possible that, with the addition of oxygen, the median electron energy, or electron temperature, as it is sometimes called, will move to higher energies until the excitation of the compound state of nitrogen establishes an equilibrium, as indicated by the dashed curve 52 of FIG. 2. Moreover, this tendency of oxygen, or an electronegative element, to raise the electron temperature would account for the fact that the total nitrogen pressure can be usefully increased, maintaining the ratio of electron temperature to gas pressure at a selected level, inasmuch as a sufficient number of high-energy electrons are now available to excite the compound state of substantially all of the nitrogen in spite of the increased number of electron-molecule collisions that tend to reduce electron energy. The horizontal displacement or bulge in each curve indicates relative numbers of electrons at the different energies. The greater numbers of electrons at energies exceeding or equal to the energy of the compound state of nitrogen are much more effective in populating that nitrogen energy level than are the lower energy electrons. The excited compound state of $N_2$ then decays efficiently to the nitrogen energy level which is effective in pumping carbon dioxide molecules to enable the 10.6 micron stimulated emission of radiation.

Figure 7:
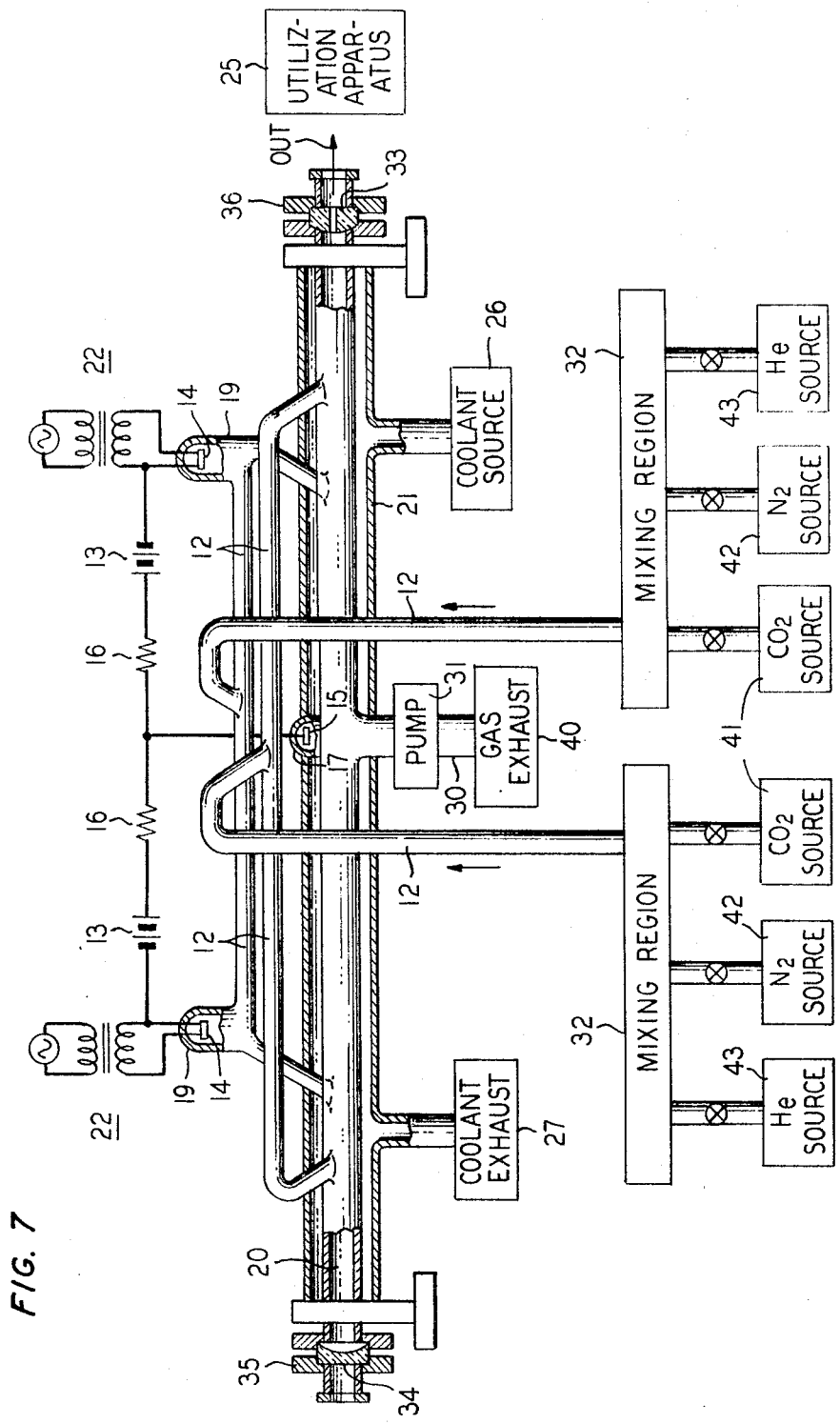
FIG. 7 shows schematically and block diagrammatically a partially cutaway view of another embodiment of the invention employing helium.

As illustrated in FIG. 7, a laser operated with helium added to the gas mixture included the interaction region comprising a tube 20 having an internal diameter of at least 2 inches in the portion in which the lasing action was obtained, apparatus for furnishing therein an appropriate gas mixture and apparatus for exciting the gas mixture with a direct-current discharge with a voltage substantially directly related to the helium partial pressure, as shown in the table of examples below.

Illustratively, the gas mixture was furnished by a continuous flow thereof from suitable sources 41, 42 and 43 of carbon dioxide, nitrogen and helium, respectively. The gases were flowed through mixing regions 32 and inlet apparatus 12 into the interaction region; and the spent gases were removed from the interaction region to the exhaust 40 by a pump 31.

The gas mixture was excited by electrical discharge apparatus disposed, for convenience, in one branch of the inlet apparatus 12. Specifically, the discharge apparatus included the oxide-coated cathodes 14 disposed in bulbous appendages 19 of apparatus 12 near ends of tube 20, the anode 15 disposed in the bulbous appendage 17 of tube 20, the DC voltage sources 13 with positive terminals connected to anode 15 through current-limiting resistors 16 and negative terminals connected to cathodes 14, and the heater current sources 22 connected across cathodes 14. Because the anode 15 is disposed in the interaction region of tube 20, the discharge runs directly through the interaction region, in which the lasing action is obtained.

To increase the so-called population inversion between the upper and lower laser levels, i.e., the energy states associated with the stimulated radiation, it is desirable to increase the difference between the so-called rotational temperature and the vibrational temperature of the carbon dioxide. To this end, the tube 20 was surrounded by the jacket 21 through which was flowed a coolant from source 26 to exhaust 27. Water at 15° C. was used in the experiments described in detail herein but any other coolant capable of depressing the rotational temperature of the gas below room temperature could be used, for example, methanol at −78° C., as disclosed in my above-cited copending application. The coolant determined the wall temperature of tube 20 and thus depressed the rotational temperature of the carbon dioxide. It appeared that the vibrational temperature was not substantially affected by the coolant.

To achieve oscillation, it is important to include the interaction region in an optical resonator. In the specific design being discussed, the resonator was formed by a pair of mirrors 33 and 34, the latter concave with 50 meters radius of curvature and the former convex with 48.5 meters radius of curvature in order to enlarge the mode volume to use the entire gas mixture within the interaction region for laser action. For the best results achieved thus far, energy was coupled out from the resonator through a 15 millimeter diameter aperture in the center of convex mirror 33. The mirrors were spaced 300 centimeters apart and were supported by suitable mirror mounts 36 and 35, respectively; and they were coated to be opaque with vacuum-deposited gold. The aperture diameter may vary from any practical lower limit, such as 1.0 millimeter up to 25 millimeters while still obtaining substantially improved results according to the present invention, as compared to previous vibrationally excited gas mixtures. In another embodiment the optical resonator includes a pair of concave mirrors having 50.8 centimeters radius of curvature, and the energy was coupled from the optical resonator through a 1.5 centimeter diameter aperture in the center of one of the mirrors. The spacing of the mirrors remains substantially the same. Because of possible lens effect in the flowing gases because of cooled laser tube walls, apparently it is not possible to calculate the mode volume from the confocal resonator theory.

If the laser be intended for use as a straight-through amplifier, the resonator becomes unnecessary; and the mirrors can be eliminated. In some instances it may be preferred to locate the mirrors outside the interaction region, in which case Brewster-angle windows (for example, of crystalline zinc oxide, barium fluoride or potassium chloride) can be used to confine the interaction region. If the laser be used in the ring laser form, three or more mirrors will be used to form the ring.

Another use for a large diameter laser is as a multipass amplifier. In this case, the mirrors may be disposed to define nonoverlapping paths for the beam in the tube.

The tube 20 in which the multiple gases interacted in the embodiment of FIG. 6 was a glass tube, although it could be some other rigid tubular structure, such as a tube of nonconducting plastic or quartz. The glass tube 20 extended the distance between mirrors 33 and 34 and had an inside diameter of 3 inches. The effective interaction region was observed to extend between the points at which apparatus 12 enters tube 20 and was about 2.5 meters long.

Cathodes 14 were oxide-coated cathodes having platinum bases and containing barium carbonate and strontium carbonate in the respective proportions 55 percent and 45 percent by weight.

Laser oscillation was obtained at a number of wavelengths involving P-branch rotational transitions P(14) to P(26), primarily P(18), P(20), P(22). The strongest transition corresponding to P(20) occurred at 10.5915 microns.

The laser power output was measured by a calibrated thermopile disposed beyond the aperture of convex mirror 33.

It should be understood that the output stimulated radiation has a variety of uses and that the calibrated thermopile could illustratively be replaced by a desired utilization apparatus 25, which could, for example, be an electro-optic modulator responsive to an information signal. The invention is particularly useful for communication, inasmuch as the atmosphere has relatively low attenuation at 10.6 microns. The wavelength range near $10.6\mu$ is commonly called an "atmospheric window."

The best specific example of the operation of my invention obtained in the early experiments involved a mixture in which the carbon dioxide had a pressure of 0.33 Torr, the nitrogen had a pressure of 1.0 Torr and the helium had a pressure of 6.0 Torr. Water was flowed through jacket 21 at 15° centigrade. Each of sources 13 provided 120 milliamperes of current at 4,400 volts, i.e., about 1,058 watts of power; and a continuous-wave power output of 133 watts from the laser was measured by the calibrated thermopile. The overall efficiency was 12.5 percent.

Various specific examples of the operation of the invention were as follows, example 8 being that just given:

|  | Examples | | | | | | | |
|---|---|---|---|---|---|---|---|---|
|  | 1 | 2 | 3 | 4 | 5 | 6 | 7 | 8 |
| Pressure: | | | | | | | | |
| $CO_2$, torr | 0.5 | 0.2 | 0.35 | 0.4 | 0.33 | 0.33 | 0.33 | 0.33 |
| $N_2$, torr | 2.5 | 1.0 | 1.0 | 1.0 | 1.00 | 1.0 | 1.0 | 1.0 |
| He, torr | | 4.67 | 5.0 | 3.5 | 4.00 | 5.0 | 5.0 | 6.0 |
| Total mixture flow rate, liters/sec | 3 | 3 | 3 | 3 | 3 | 3 | 3 | 3 |
| Aperture dia. mms | 10 | 10 | 25 | 10 | 10 | 15 | 15 | 15 |
| Coolant temp. °C | 15 | 15 | 15 | 15 | 15 | 15 | 15 | 15 |
| Coolant flow rate, gpm | 10 | 10 | 10 | 10 | 10 | 10 | 10 | 10 |
| Cathode total heater power, watts | [1] 200 | [1] 200 | [1] 200 | [1] 200 | [1] 200 | [1] 200 | [1] 200 | [1] 200 |
| Pumping voltage: | | | | | | | | |
| $V_1$ (volts) | 2,700 | 3,800 | 3,800 | 3,800 | 4,000 | 4,800 | 4,700 | 4,400 |
| $V_2$ (volts) | 2,700 | 3,800 | 3,700 | 4,000 | 3,600 | 3,900 | 4,000 | 4,400 |
| Pumping current: | | | | | | | | |
| $I_1$ (ma.) | 87 | 160 | 160 | 180 | 150 | 136 | 130 | 120 |
| $I_2$ (ma.) | 87 | 140 | 170 | 170 | 185 | 196 | 150 | 120 |
| Pumping power: $W_1$ and $W_2$, watts | 474 | 1,140 | 1,237 | 1,124 | 1,265 | 1,415 | 1,210 | 1,058 |
| Output power: $W_1$ and $W_2$, watts | 15.0 | 55.0 | 53.6 | 82.5 | 103 | 116 | 108 | 133 |
| Efficiency percent | 3.2 | 4.8 | 4.3 | 7.1 | 8.2 | 8.2 | 9.0 | 12.5 |

[1] 100 watts each.

Higher gas pressures can be used if the discharge voltage is raised in direct relation to the pressure.

I believe that an important aspect of my present invention resides in my discovery that the tube readily may have an internal diameter greater than about 2 inches and in my discovery that the pressure ratios at a given tube diameter are important for optimum beneficial effect of the helium. The significant factor in the relationship of the tube diameter and gas pressure is preventing deactivation of vibrationally excited species at the tube wall. Thus, if smaller tube diameters are used, to maintain the efficiency high, there should be increased pressures of the gases, particularly $CO_2$ and helium.

One modification of the present invention involves the use of nitrous oxide as the active gas instead of carbon dioxide. Because of the closeness of certain of its energy levels, useful for laser action, to the corresponding energy levels of carbon dioxide, all of the foregoing considerations stated as applicable to carbon dioxide are also applicable to nitrous oxide. Previous laser experiments with both carbon dioxide and nitrous oxide indicate that these gases are sufficiently similar that the useful ranges of working pressures of nitrous oxide in combination with nitrogen and helium would be approximately the same as the corresponding range of pressures of carbon dioxide. Similarly, the useful ranges of pressure for the helium and the nitrogen should be approximately as described above.

It is now understood that one beneficial role of water vapor and helium in lasers according to my invention resides in their ability to relax the excitation of molecules having the vibrational energy of the lower laser level. Helium is also important for raising the average electron energy in the discharge, in a manner similar to that shown for oxygen in FIG. 4.

In all cases, it is understood that the above-described arrangements are illustrative of a small number of the many possible embodiments that can represent applications of the principles of the invention. It can be appreciated that many of the design parameters are interrelated so that in most instances the optimum mixture for a devised tube design is best determined experimentally consistent with the principles outlined. Numerous and other arrangements can readily be devised in accordance with these principles by those skilled in the art without departing from the spirit and scope of the invention. In particular, other arrangements can be used for exciting the gas discharge, such as a radio frequency discharge.

In all of the foregoing embodiments, the gases designated to be present in each of the lasers is present in an amount at least two orders of magnitude greater than trace amounts. In lasers, such as the well-known helium-neon laser, trace amounts are considered to be amounts less than about 10 parts per million by partial pressure.

I claim:
1. An infrared laser comprising:
   an active medium including carbon dioxide,
   means for selectively populating a first vibrational-rotational level of said carbon dioxide, which vibrational-rotational level is optically connected to a lower vibrational-rotational level via radiation at about 10 microns, to establish a population inversion therebetween, and
   means for resonating said radiation to produce coherent radiation at about 10 microns, including
   means for abstracting a portion of said coherent radiation.
2. A laser according to claim 1 adapted for oscillation on transitions having wavelengths near 10.6 microns.
3. An infrared laser comprising:
   an active medium including carbon dioxide,
   means for selectively populating a first vibrational-rotational level of said carbon dioxide, which vibrational-rotational level is optically connected to a lower vibrational-rotational level via radiation at about 10 microns, to establish a population inversion therebetween, and
   means for resonating said radiation to produce coherent radiation at about 10 microns, including
   means for abstracting a portion of said coherent radiation,
   the means for selectively populating the first vibrational-rotational level of carbon dioxide comprising
   means for forming spaced first and second regions,
   means for flowing nitrogen gas through said first region,
   means for heating said nitrogen gas in said first region to a temperature producing substantially no ionization of said nitrogen to populate an excited level thereof,
   means for flowing said carbon dioxide gas and said heated nitrogen gas through said second region to mix and thereby to populate said first vibrational-rotational level of said carbon dioxide gas,
   the resonating means being associated with said second region.